United States Patent
Hsia et al.

(10) Patent No.: US 7,665,798 B2
(45) Date of Patent: Feb. 23, 2010

(54) MEANS AND METHODS TO REDUCE DRAGS

(76) Inventors: Chih-Yu Hsia, 301 Warren Way, Arcadia, CA (US) 91007; Michael Jonathan Hsia, 301 Warren Way, Arcadia, CA (US) 91007; Patricia Shirley Hsia, 301 Warren Way, Arcadia, CA (US) 91007

(*) Notice: Subject to any disclaimer, the term of this patent is extended or adjusted under 35 U.S.C. 154(b) by 77 days.

(21) Appl. No.: 11/712,713

(22) Filed: Mar. 1, 2007

(65) Prior Publication Data
US 2008/0211260 A1    Sep. 4, 2008

(51) Int. Cl.
    *B60J 1/04*    (2006.01)
(52) U.S. Cl. .................................... 296/180.5; 114/271
(58) Field of Classification Search ............. 296/180.1, 296/180.2, 91, 95.1, 180.5; 180/903; 114/271, 114/288, 290; 244/199.1, 199.2, 204, 199.4
    See application file for complete search history.

(56) References Cited
U.S. PATENT DOCUMENTS

| | | | | |
|---|---|---|---|---|
| 2,177,887 A | * | 10/1939 | Huet | 105/1.1 |
| 2,792,254 A | * | 5/1957 | Hagglund | 296/91 |
| 3,276,811 A | * | 10/1966 | Schmidt | 296/91 |
| 3,910,623 A | * | 10/1975 | McKeen | 296/91 |
| 4,159,845 A | * | 7/1979 | Bratsberg | 296/91 |
| 4,170,381 A | * | 10/1979 | Helm | 296/91 |
| 4,320,920 A | * | 3/1982 | Goudey | 296/180.4 |
| 4,810,022 A | * | 3/1989 | Takagi et al. | 296/180.5 |
| 6,926,346 B1 | * | 8/2005 | Wong et al. | 296/180.5 |

FOREIGN PATENT DOCUMENTS

| | | | |
|---|---|---|---|
| FR | 0060669 | * | 3/1912 |
| GB | 0471342 | * | 9/1937 |
| GB | 2270658 A | * | 3/1994 |

* cited by examiner

*Primary Examiner*—Glenn Dayoan
*Assistant Examiner*—Melissa A Black
(74) *Attorney, Agent, or Firm*—William W. Haefliger

(57) ABSTRACT

A drag reduction mean which consists a duct and a support mean which duct can reflect passed through flows and which is mounted on one end of the support mean which another end can be mounted on an object which can move in a fluid; the length of the support mean being able to be altered by a mechanical mean; the ratio of the cross-sectional areas of the entrance and the exit of the duct being able to be altered; the normal directions of the exit of the duct being able to be altered; the algorithms of using the drag reduction means being revealed.

16 Claims, 15 Drawing Sheets

MEANS AND METHODS TO REDUCE DRAGS

BACKGROUND OF THE INVENTION

1. Field of the Invention

This invention relates to means and methods to reduce drags and particularly to means and methods to guide flows to create a region in front and/or behind a moving object (body) to make the moving body a fluid dynamically desirable object to reduce the drags.

2. Description of the Prior Arts

No prior art related to means and methods to reduce drags was found.

SUMMARY OF THE INVENTION

Generally, a moving streamlined object receives the least drags. Traditionally combinations of elongated relatively sharp-pointed protruding portions in the front and at the back of a moving object create a streamlined body. These elongated protruding portions usually take much spaces and materials. As a result, they often result in inconveniences, extra costs, wasting materials and spaces, etc. Therefore, methods and means to create fluid dynamically desirable bodies but not using the protruding portions are being sought.

The invented means and methods to reduce drags uses stationary and/or movable guide veins or reflectors to create special regions in the front and/or at the back of a moving body. These regions together with the moving body will create a fluid dynamically desirable object which generates reduced drags. This in turns reduces the drags of the moving body.

There are guide veins or reflectors which are commonly seen on trucks. But these guide veins are different from the current invention. The major differences between these guide veins or reflectors and the current invented devices are that the current invented devices will be mounted on the moving body but will protrude beyond the main moving body. The guide vein or reflector which are commonly seen near the front of a truck will "tune up" the flow locally around the top of the truck. The invented devices mounted on the front of a truck will project a stream which reacts with the incoming stream to form a relatively sharp-pointed region far ahead and in front of the truck. This sharp-pointed region together with the truck will create a relatively streamlined truck front which has reduced drags. The invented devices mounted near the rear end of the moving body will guide flows relatively quickly to the back of the moving body to refill/replace the vacuum or low pressure regions created by the moving away of the moving body. This in turns can reduce the drags.

The invented stationary or movable guide veins or reflectors are relatively inexpensive to make and are relatively easy to use. These and other objects and advantages of the invention, as well as the details of an illustrative embodiment, will be more fully understood from the following specification and drawings, in which:

DRAWING DESCRIPTION

GENERAL DESCRIPTION

Several variations of the invented device are introduced herein in this specification.

Figure 1:
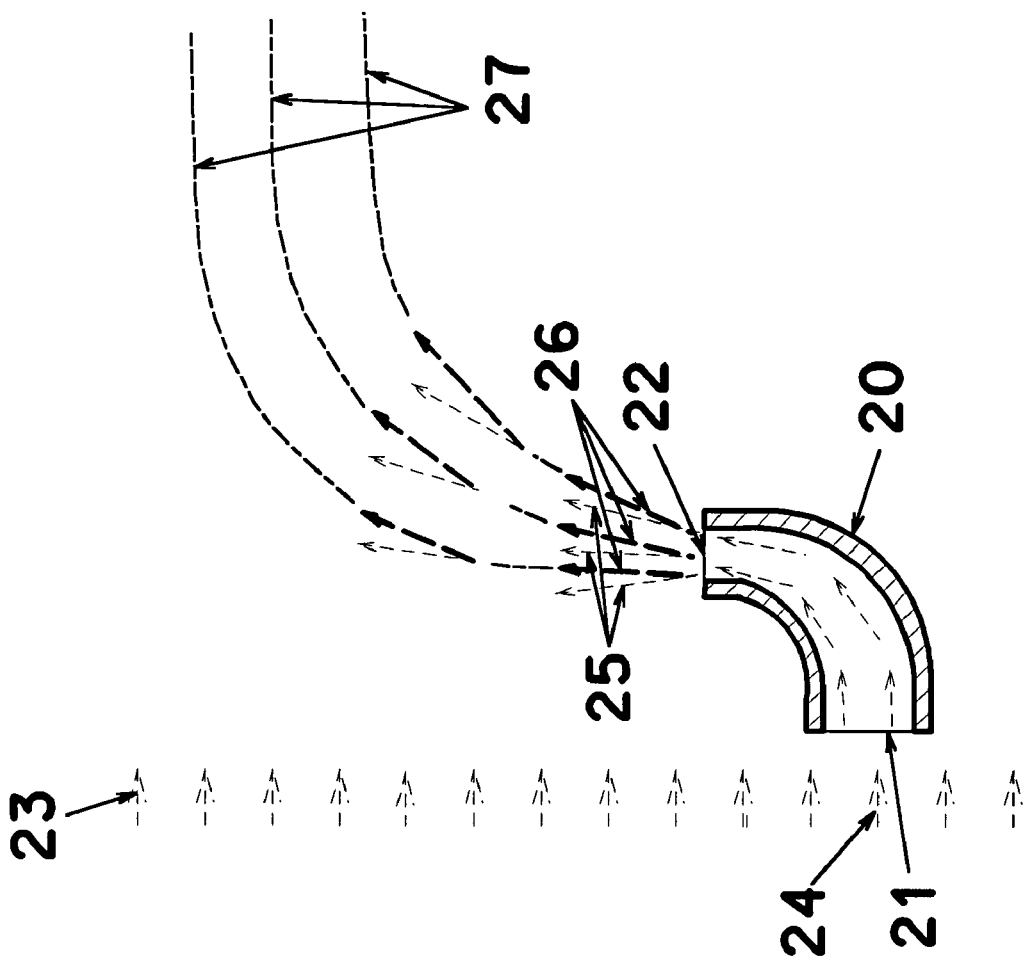
FIG. 1 is a sectional view which illustrates the fundamental principle of the invented device.

Referring to FIG. 1, the flow reflection duct 20 has an entrance 21 and an exit 22. When the flow reflection duct is in a flow field, represented by the flow vectors 23, a portion of the flow 24 enters through the entrance 21 of the flow reflection duct 20 then leaves the flow reflection duct 20 though the exit 22. Due to the reflections of the flow reflection duct, the exited flow should have followed the flow vectors 25 if there were no other forces act on them. However, because the flow reflection duct is in the flow field, the rest of the flow vectors 23 which do not enter the flow reflection duct will work on the flow vectors 25 to form the resultants 26 of these flow vectors. The successively gradually varied resultants 26 will form a flow path 27 which serves as a flow curtain to shield things behind the flow reflection duct. When a flow reflection duct is mounted at a distance in front of a relatively blunt moving body, the flow curtain formed by the resultants of the flows, from the flow field and from the flow reflection duct, form a pseudo front "cone" for the blunt moving body. The blunt moving body is then fluid dynamically becomes a moving body with a streamlined front cone and thus causes reduced drags.

Figure 2:
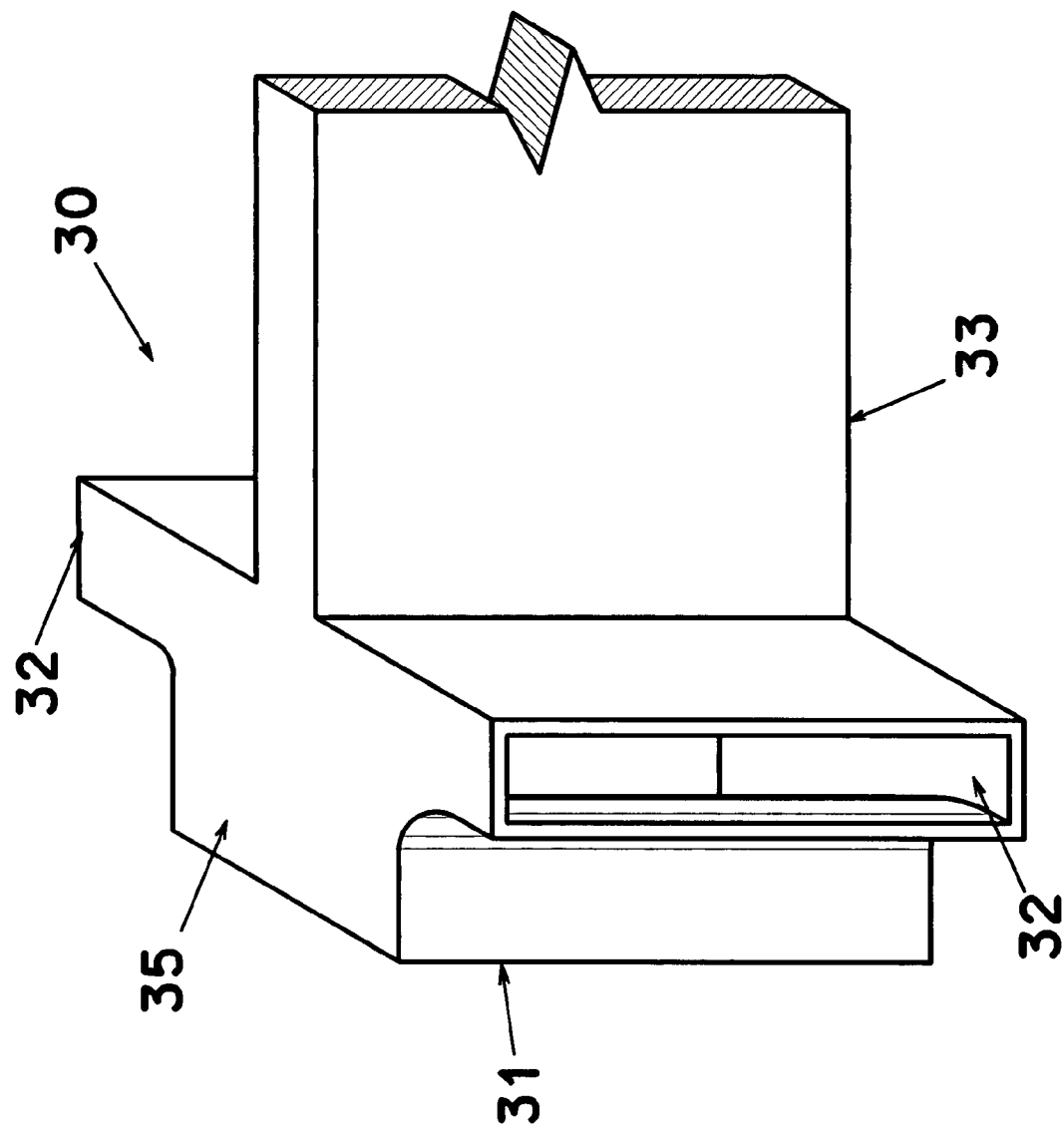
FIG. 2 is an isometric view of one variation of the invented devices.

Referring to FIG. 2, an invented flow reflector 30 has a flow reflection duct 35 in the front of a support 33 which is a relatively rigid member which can be mounted on an object (not shown) which will move in a fluid field. The length of the support 33 can be optionally adjustable so that the position of the flow reflection duct relative to the object on which the flow reflector is mounted can be adjusted (referring to FIG. 7 which will be described later). The flow reflection duct 35 has an entrance 31 in the front and exits 32 on the sides. Basically, the flow reflection duct 35 is a duct system which takes flow from its entrance 31 then diverts the flow sideways through its exits 32. The entrance is capable of intake flow while the exits can divert the intake flows in the relatively transverse directions of the flow. Accordingly, the outlet of the duct has portions extending in generally opposite directions.

Figure 3:
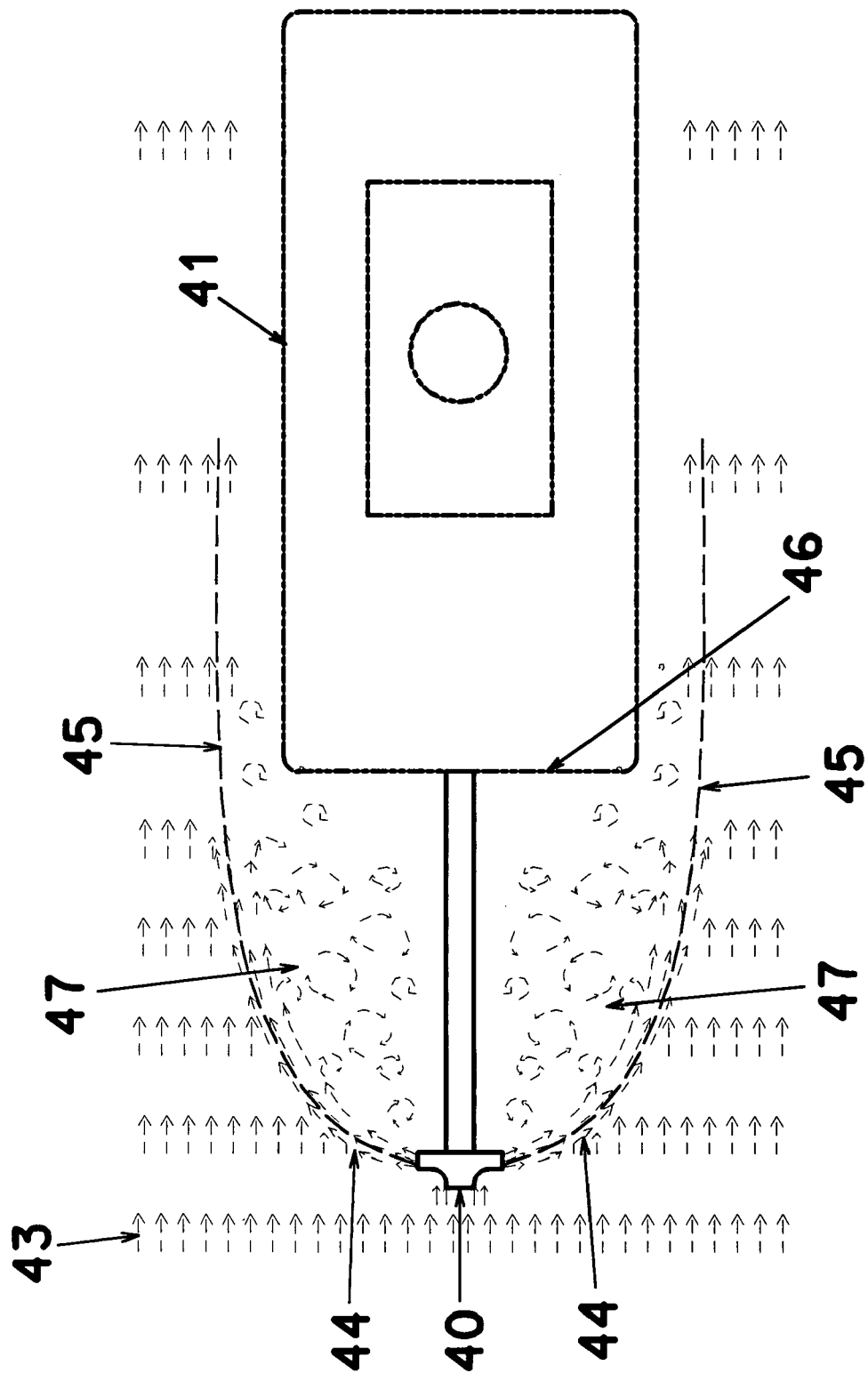
FIG. 3 is a plan view which illustrates the functions of the device shown in FIG. 2.

Referring to preferred FIG. 1 and FIG. 3, a boat 41 has a flow reflector 40, the same one described in FIG. 2, mounted on its front. The boat has a blunt front 46. When the boat is moving forward, the incoming flow (represented by the vectors 43) moves backwards. A portion of the flow enters the flow reflection duct of the flow reflector then exits to the sides of the flow reflection duct to form reflected flow jets 44 extending in generally opposite directions. This reflected flow jets work with the incoming flows to form a pseudo boat front 45 which is much more streamlined than the blunt front 46 of the boat. Eddies 47 will form in the region bounded by the pseudo boat front and the boat. The shape of the pseudo boat front varies with the speeds of the boat. The faster the boat moves, the higher speed the reflected flow 44 moves. The faster the reflected flow moves, the wider and the longer the pseudo boat front will be. The best pseudo boat front for the performance of the boat in terms of drags is that the ends of the pseudo boat fronts meet with the edges of the sides of the boat. In this way the boat then will have the hydrodynamic shape as prescribed by the pseudo boat front, the sides of the boat and the end of the boat. The boat can then encounter reduced drags due to the much hydrodynamic streamlined boat body. Accordingly, and generally, the support means has a forwardmost region said inlet projecting forwardly of said region, into oncoming medium.

Figure 4:
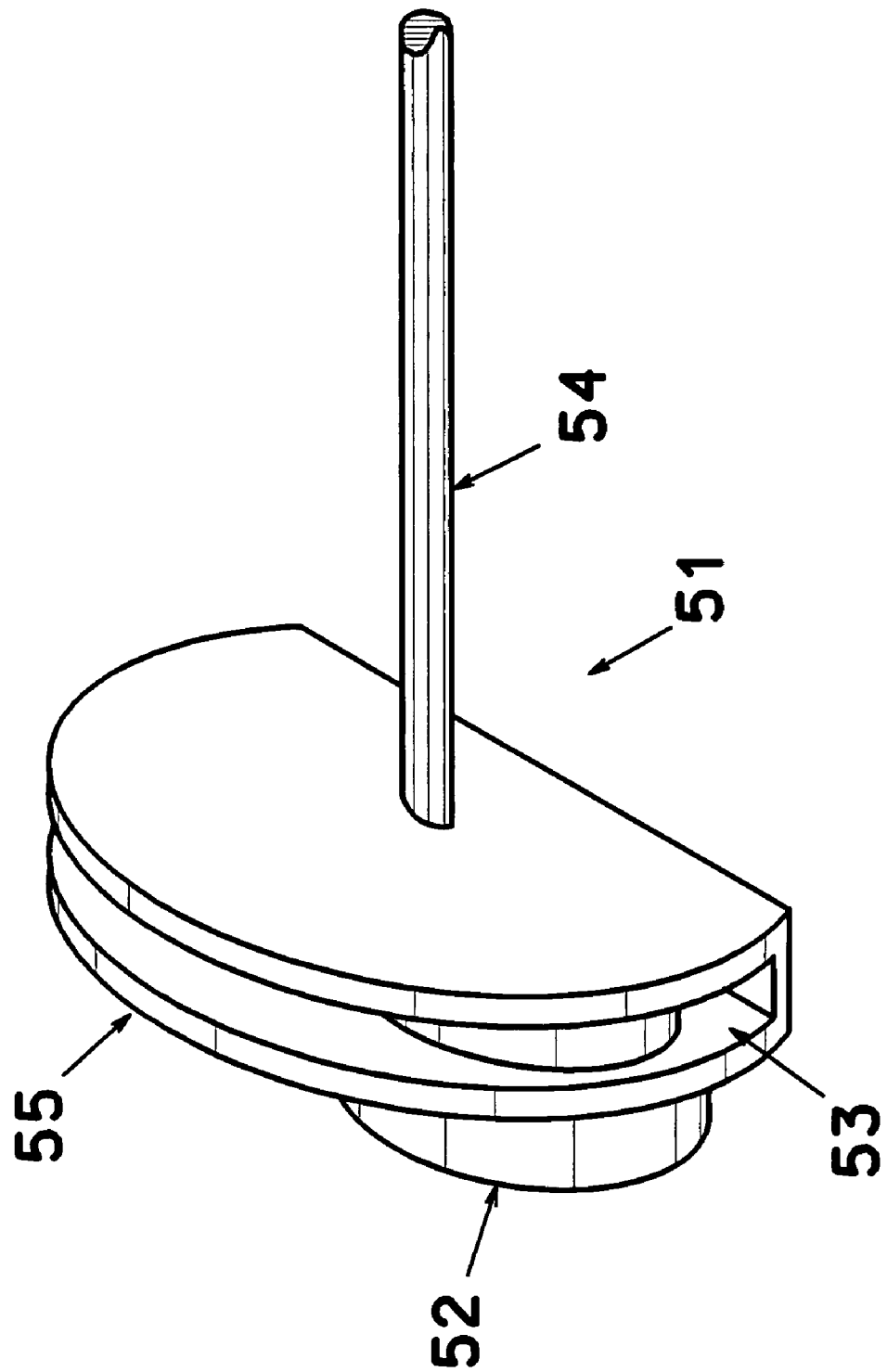
FIG. 4 is an isometric view of another variation of the invented devices.

Referring to FIG. 4, one variation of a flow reflector 51 consists of flow reflection duct 55 mounted on a flow reflector support 54 which is mounted in the front of a moving body (not shown). The flow reflection duct 55 has a flow entrance 52 which is capable of receiving incoming flow streams. The flow reflection duct 55 has a curved flow exit 53 which allows flow streams, entered in the flow entrance 52, be spread in relatively transverse directions of the incoming flow to the flow entrance 52. The flow reflector support 54 can be any relatively rigid member which connects with the flow reflection duct at one end and with the body which will travel in the fluid at the other end. The length of the support 54 can be optionally adjusted so that the position of the flow reflection duct relative to the body on which the flow reflector is mounted can be adjusted (referring to FIG. 7 which will be described later).

Figure 5:
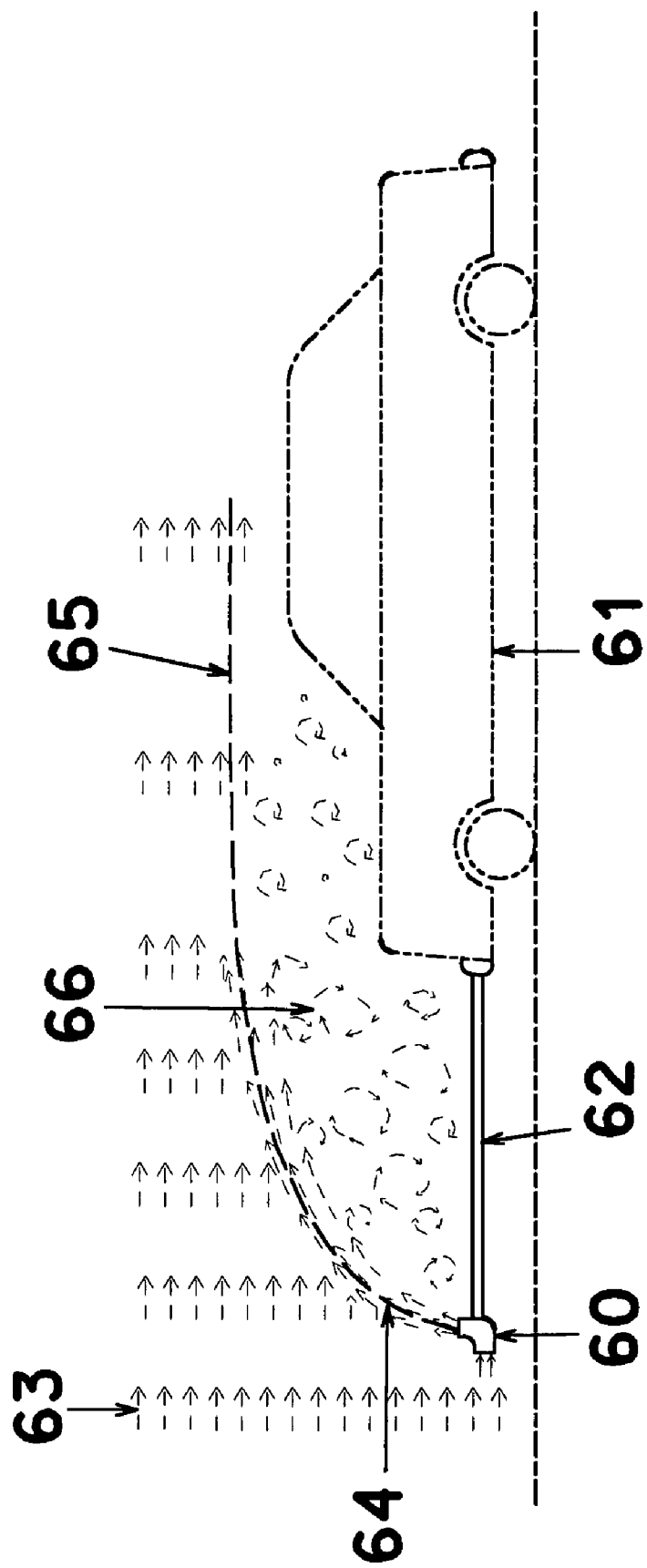
FIG. 5 is a side view which illustrates the functions of the device shown in FIG. 4.

Referring to FIG. 5, the flow reflector 60 of the invented devices shown in FIG. 4 is mounted in the front of a car 61 by the flow reflector support 62. When the car moves forward, the incoming flow 63 (all of the flows are represented by vectors herein) is created. Some of the incoming flow enters the flow reflection duct then exit as the reflected flow 64. The reflected flow 64 together with the incoming flow 63 form the pseudo car front 65 which is a flow curtain separating the incoming flow 63 and the eddies 66. The car with the flow reflector is then become a much hydrodynamic streamlined body when moving. Similar to aforementioned discussions, the shape of the pseudo car front varies with the speeds of the car. The faster the car moves, the higher speed the reflected flow 64 moves. The faster the reflected flow moves the wider and the longer the pseudo car front will be. The best pseudo car front for the performance of the car in terms of drags is that the end of the pseudo car front meets with the edges of the sides and the top of the car. In this way the car then will have the hydrodynamic shape as prescribed by the pseudo car front, the sides and the top of the car as well as the end of the car. The car will then encounter reduced drags due to the much hydrodynamic streamlined overall body. Accordingly, the wheeled vehicle has a forwardmost portion, and the duct is carried to project the duct inlet forwardly of said vehicle forwardmost portion, said outlet facing generally upwardly, whereby said deflected medium components define curved paths extending above and rearwardly relative to the vehicle.

Many variables affect the shapes and positions of the pseudo boundaries. The car speed or boat speed affects the speeds of the reflected flows which affect the shapes of the pseudo car front or the pseudo boat front. The reflected angles, relative locations of the flow reflection ducts, and the entrance to exit opening ratios of a flow reflection duct also affect the velocities of the reflected flows. The following paragraphs will describe the devices to handle and control those variables.

Figure 6:
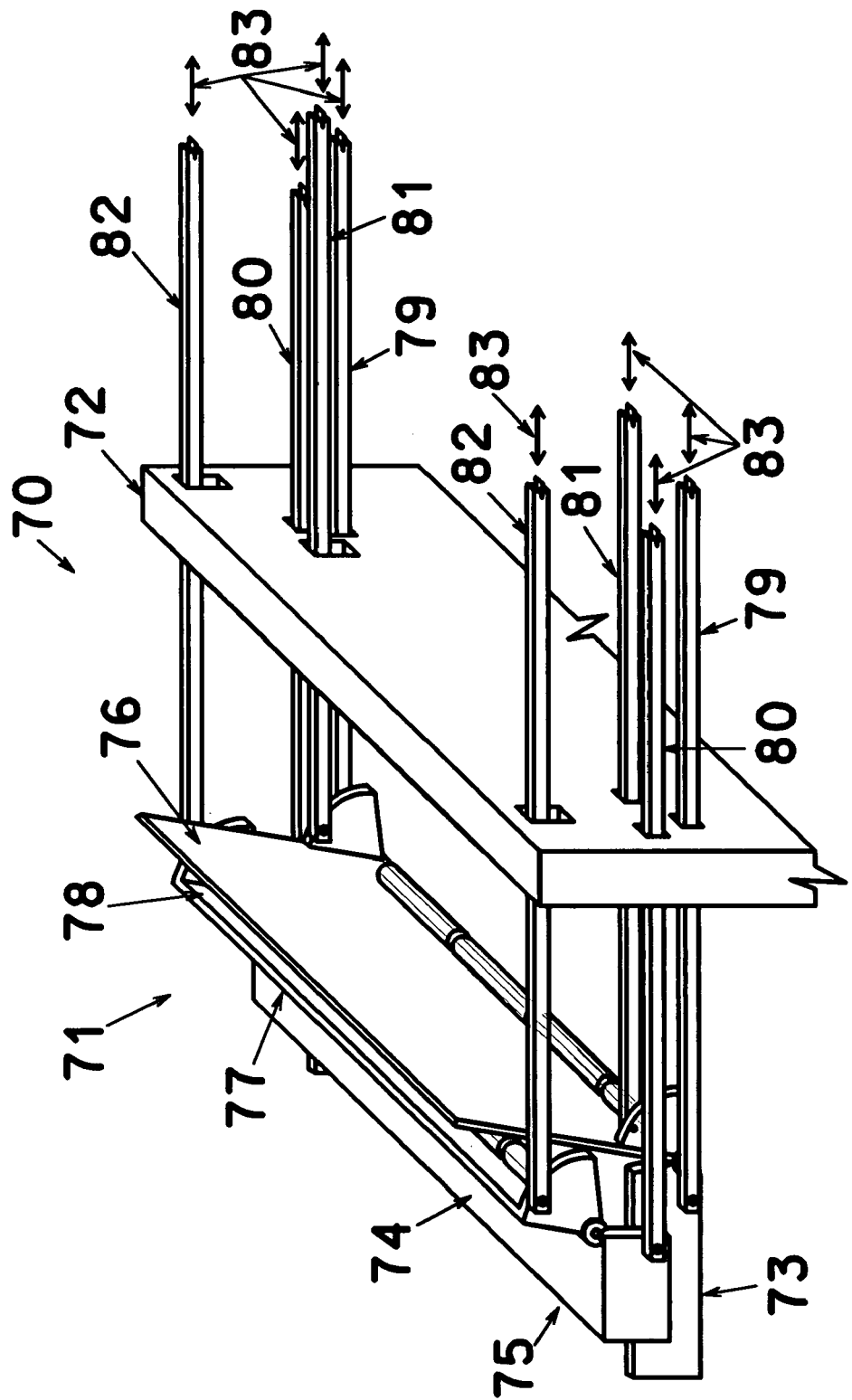
FIG. 6 is an isometric view of the third variation of the invented device.

Referring to FIG. 6, an adjustable flow reflector 70 has an adjustable flow reflection duct 71 which is supported by a support 72 which can be mounted to an object, such s an extension part of a car or a boat (not shown). The adjustable flow reflection duct mainly consists of many plates, an inflow bottom plate 73, an inflow top plate 74, an outflow bottom plate 76, and an outflow top plate 77. Each of the plates (namely 73, 74, 76 and 77) has two controllers, the inflow bottom plate controllers 79, the inflow top plate controllers 80, the outflow bottom plate controllers 81, and the outflow top plate controllers 82. These controllers (79, 80, 81 and 82) are rods which are supported by the support 72. The controllers are also mounted on a device (referred to FIG. 7 which will be described later) which can move the controllers in the directions 83. The inflow bottom plate and the inflow top plate together form the entrance 75 of the flow reflection duct. The outflow top plate and the outflow bottom plate form the exit 78 of the flow reflection duct. The pulling and pushing of the controllers (79, 80, 81 and 82) to different positions can alter the speeds and angles of flows reflected because the widths of the exit and the angles of the exit can be changed. This allows the controls and selections of the shapes and positions of the pseudo car or boat fronts. Accordingly, the duct comprises multiple plates, there being one or more control elements connected to one or more of the plates to shift plate position for controlling the direction of said jet stream.

Figure 7:
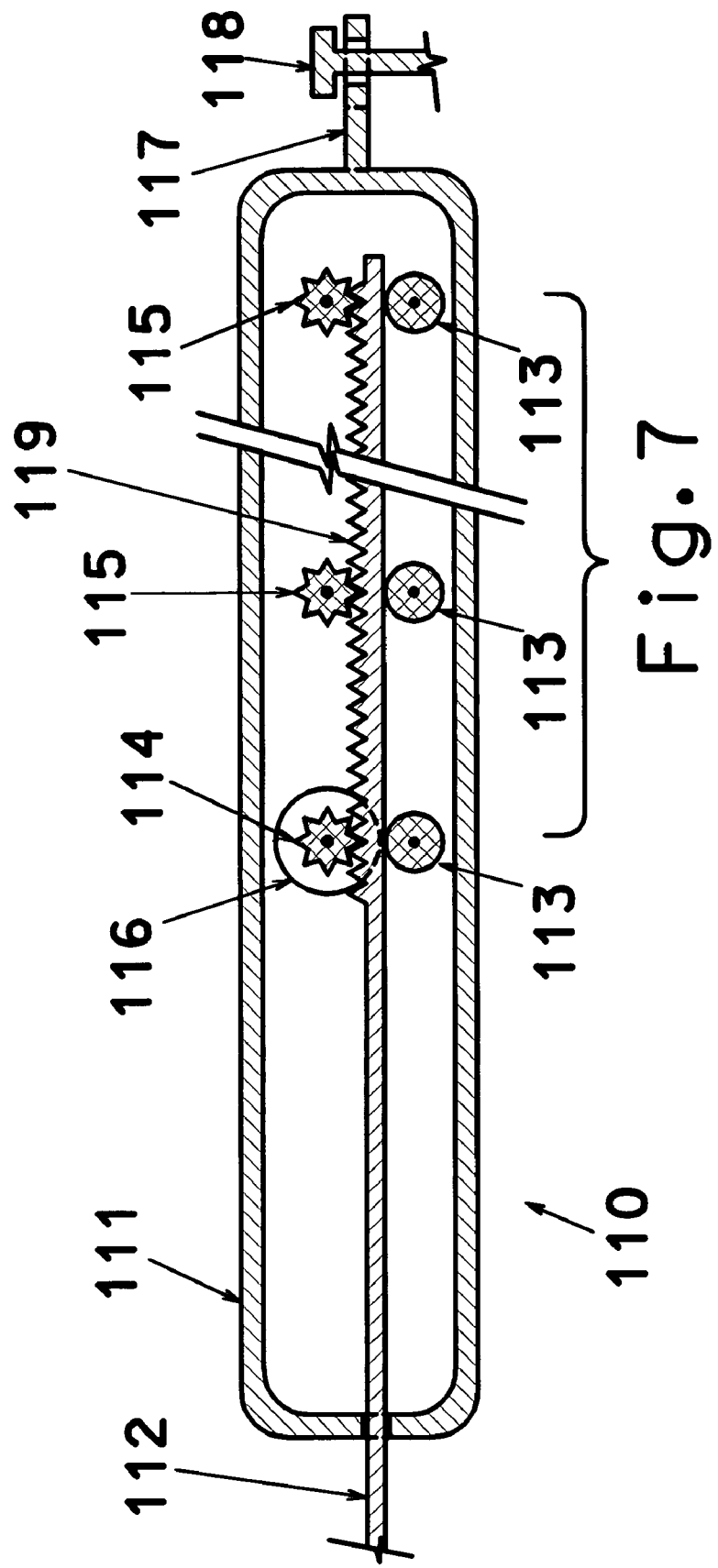
FIG. 7 is a sectional view which illustrates a mounting device.

Referring to FIG. 7, a mounting device 110 which has an enclosure 111 which encloses several pairs of roller 113 and driven wheel 115, a driving wheel 114, a motor 116, wires or conductors (not shown), and a portion of a road 112. The rod 112 can be or be connected with the aforementioned reflector supports, the connectors, or the extensions of them. The rod 112 has teeth 119 which engages with the rollers 113, the driven wheels 115 and the driving wheel 114. The wheels and the rollers support and confine the rod 112. The motor 116 turns the driving wheel 114 which drives the teeth to move the rod forward or backward. This way, the locations of the aforementioned reflectors or the positions of the plates of the aforementioned adjustable flow reflectors can be changed. The wires or conductors supply electricity to the motor. The enclosure has mounting means, a mounting plate 117 is shown, which allows the enclosure to be mounted, by the mounting pin 118 as shown, or welded (not shown) on a body which will move in the fluid. Accordingly, means is provided and connected to one or more control elements, such as rods, there being rotary driving and linearly driven components.

Figure 8:
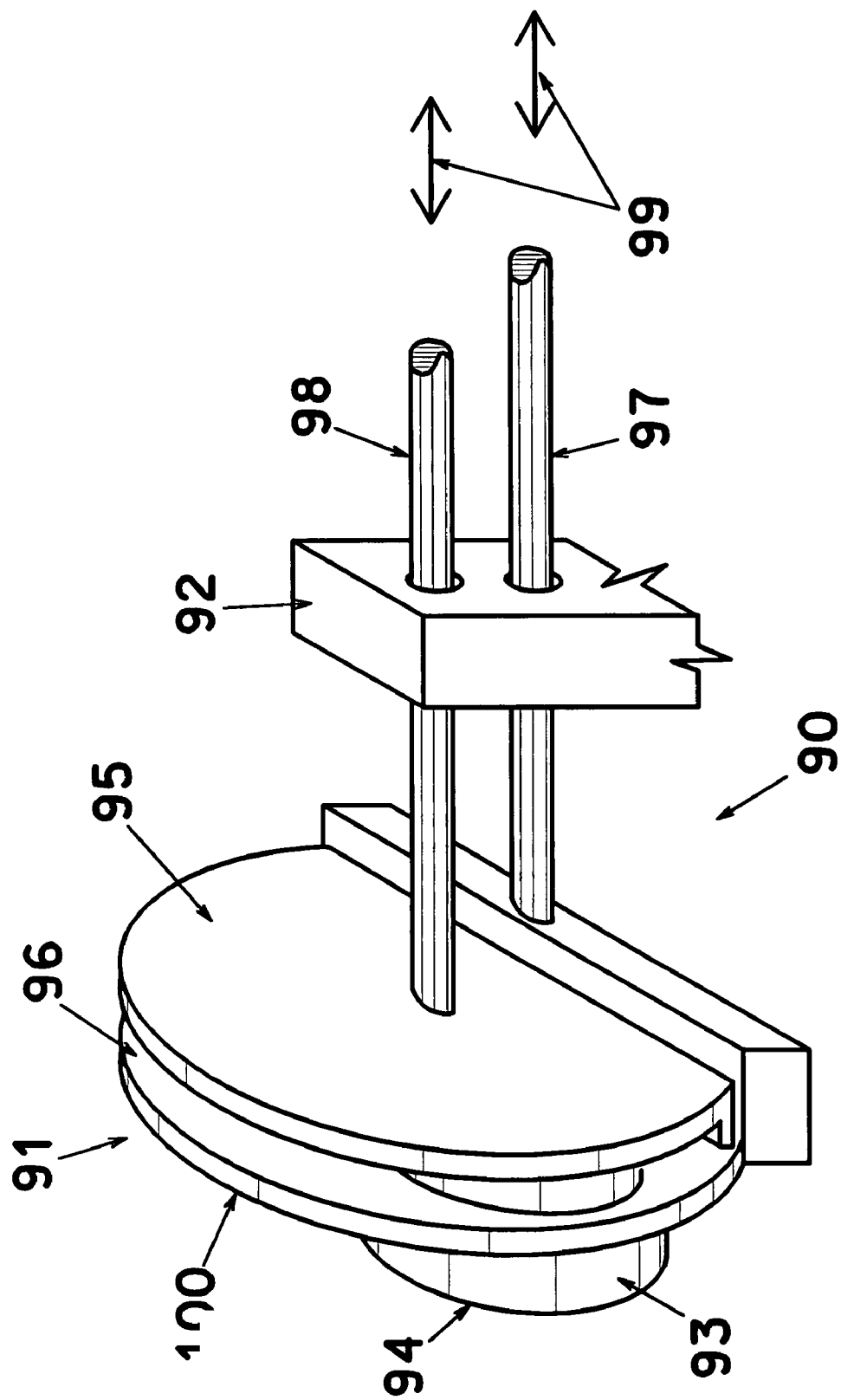
FIG. 8 is an isometric view of the fourth variation of the invented device.

Referring to FIG. 8, an alternatives of an adjustable flow reflector 90 has a adjustable flow reflection duct 91 which is supported by a support 92 which can be mounted to an object, such as a car or a boat (not shown). The adjustable flow reflection duct mainly consists of an inflow part 93 and a reflection part 95. Each of the parts (namely 93 and 95) has a controller which is a rod supported by the support 92. These controllers, the inflow part controller 97 and the reflector controller 98, are also mounted on a device (referring to FIG. 76 which is described in the above paragraph) which can move the controllers in the direction 99. The inflow part 93 has the flow entrance 94 which allows the inflows enter into the flow reflection duct. The inflow part also has the part 100 which fans behind the flow entrance. The reflection part 95 is generally a flat plate or a corn-shaped plate. A flow exit 96 is formed between the part 100 of the inflow part and the reflection part 95. The pulling and pushing of the controllers (97 and 98) will change the positions of the plates. The plates in different positions can alter the speeds of flows reflected because the widths of the exit can be changed. This allows the controls and selections of the shapes and positions of the pseudo car or boat fronts. Accordingly, the duct includes relatively movable parts, there being one or more control elements connected to one or more of said parts to shift part position for controlling the direction of the jet stream, there being means operatively connected to one or more of said control elements.

Figure 9:
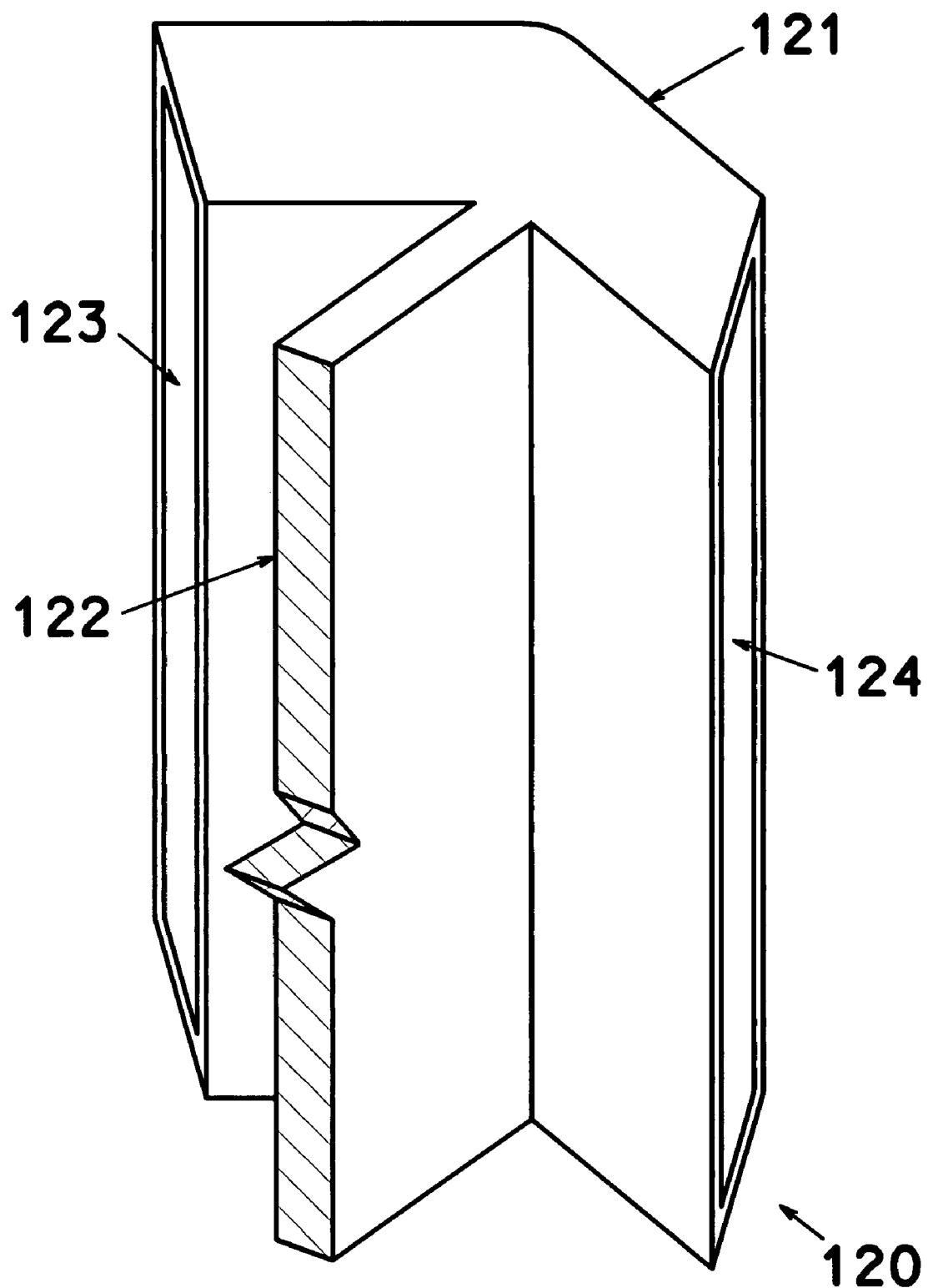
FIG. 9 is an isometric view of one variation of the invented devices.

Referring to FIG. 9, an invented flow reflector 120 to be used near the rear of a moving body has a flow reflection duct 121 and a support 122. The support is a relatively rigid member which can be mounted on an object (not shown) which will move in a fluid field. The flow reflection duct 121 has an entrance 123 in the front and an exit 124 on the back. Basically, the flow reflection duct 121 is a duct system which takes flow from its entrance 123 then diverts the flow through its exit 124. The entrance is capable of intake flow while the exit can divert the intake flows in the relatively transverse directions of the in flow. As shown, the inlet and outlet are vertically elongated, as also appears in FIGS. 2 and 10.

Figure 10:
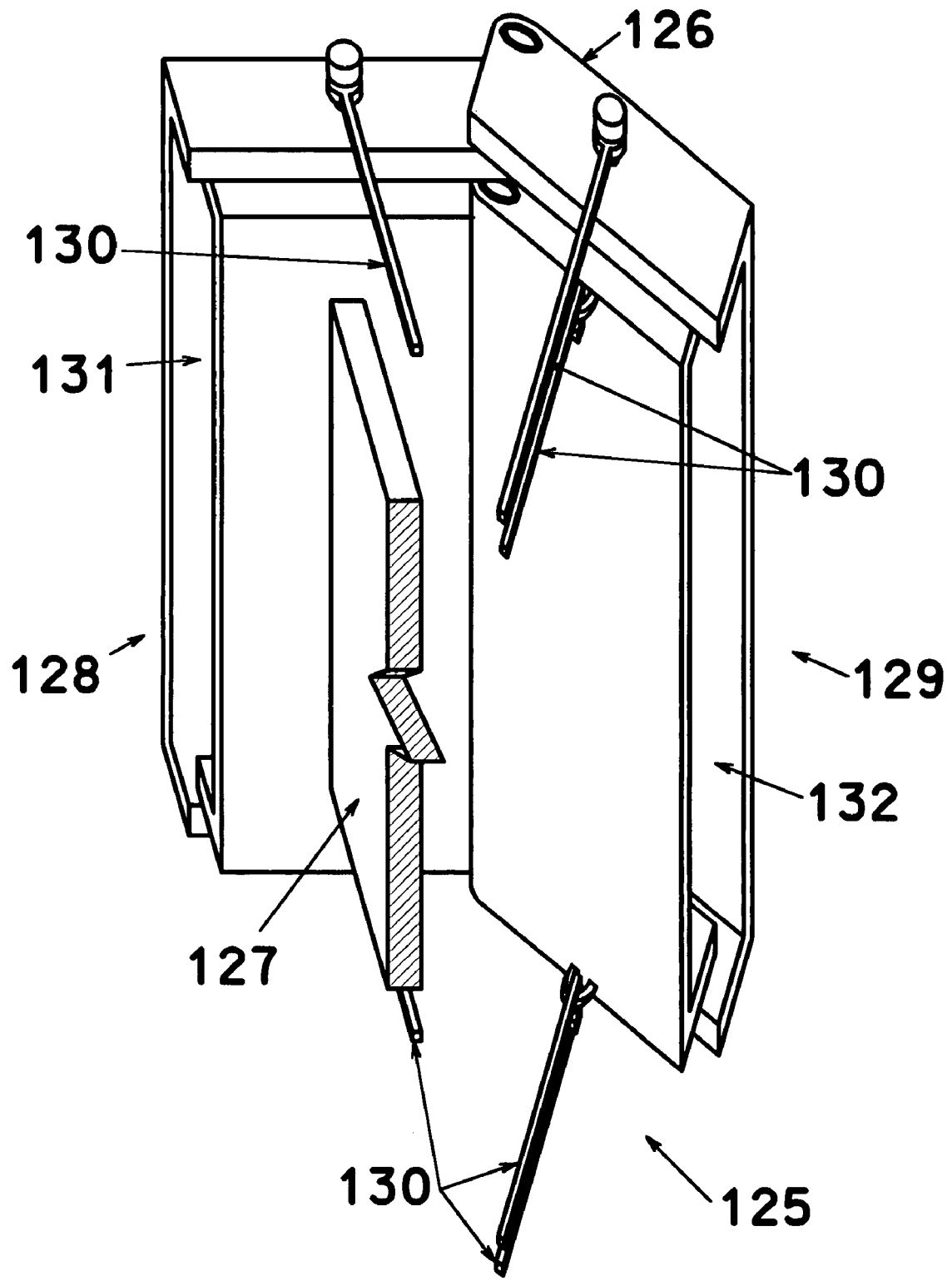
FIG. 10 is an isometric view of another variation of the invented devices.

Referring to FIG. 10, an adjustable flow reflector 125 to be used near the rear of a moving body has an adjustable flow reflection duct 126 which is supported by a support 127 which can be mounted to an object, such as a car or a boat (not shown). The adjustable flow reflection duct mainly consists of an inflow part 128 and a reflection part 129. Each of the parts is a duct which is formed by plates around. Except the plate which connects with the support 127, each of the other plates has a pair of controllers 130 which are rods. One end of a controller is hinged on the plate and the other end of the controller is mounted on the devices (referring to FIG. 7 described previously) which can move the controllers. The inflow part 128 has the flow entrance 131 which allows the inflows enter into the flow reflection duct. The reflection part 126 has an exit 132. The pulling and pushing of the controllers to different positions can alter the positions of the plates which can alter the speeds and directions of the flows reflected because the widths of the exit can be changed.

When a body moves forward in a fluid, a low pressure zone will momentarily be generated behind the moving body. This low pressure zone tends to retard the movement of the moving body. The retardant increases the drag. The flow defector or the adjustable flow reflector will divert flows and send flows relatively quickly to the low pressure zone thus reduce or eliminate the duration of the existences of the low-pressure zone. This in turns reduces the drags.

Figure 11:
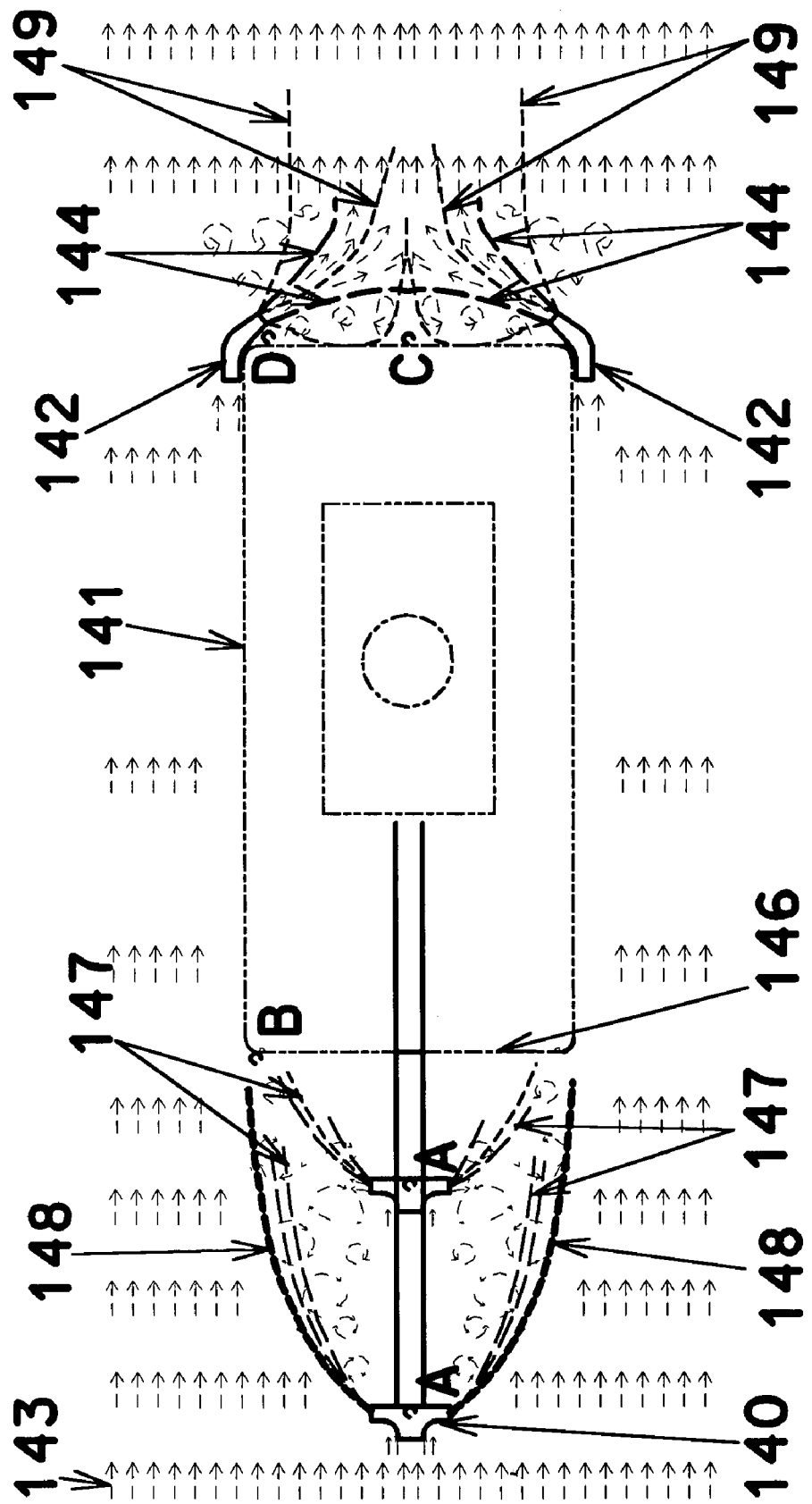
FIG. 11 is a plan view which illustrates the functions of the device shown in FIG. 2 and FIG. 9.
Figure 12:
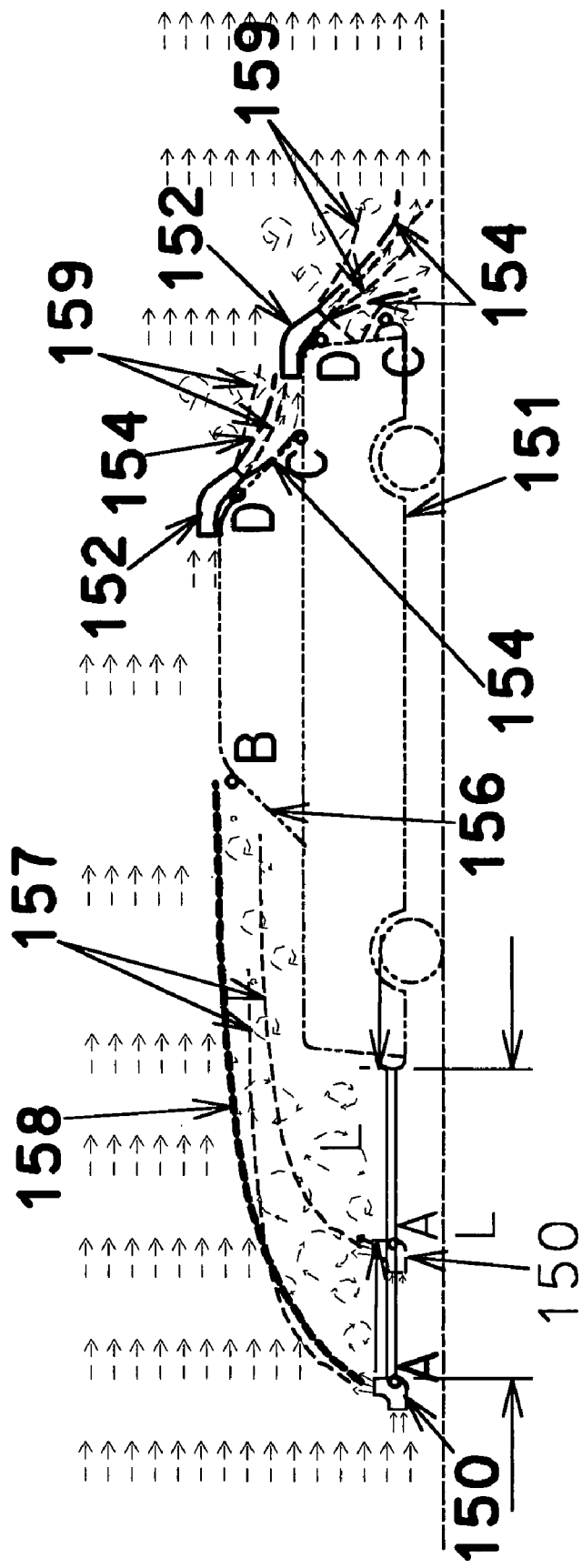
FIG. 12 is a side view which illustrates the functions of the device shown in FIG. 2 and FIG. 9.

The uses of the invented devices can be further illustrated and described. Referring to FIG. 11, a flow reflector 140 and a pair of flow reflectors 142 are mounted in the front and near the end of a boat 141. A pressure sensor A is mounted on the backside of the flow reflector 140. A pressure sensor B is mounted on the blunt front 146 of the boat. A pressure sensor C is mounted near center of the back of the boat. Another pressure sensor D is mounted on the edge of the backside of the boat. Referring to FIG. 12, a flow reflector 150 and a pair of flow reflectors 152 are mounted in the front and near the ends of a car 151. A pressure sensor A is mounted on the backside of the flow reflector 150. A pressure sensor B is mounted near the upper end of the windshield 156 of the car. A pressure sensor C is mounted near center of the near bumper or the bottom of the rear window, if a flow reflector is mounted on the roof of the car. Another pressure sensor D is mounted near the flow reflector 152. Accordingly, at least one secondary duct is provided, like the duct of FIG. 3, and located proximate the rear of the vehicle to discharge a secondary stream of said medium into the flow field rearwardly of the support means.

Figure 13:
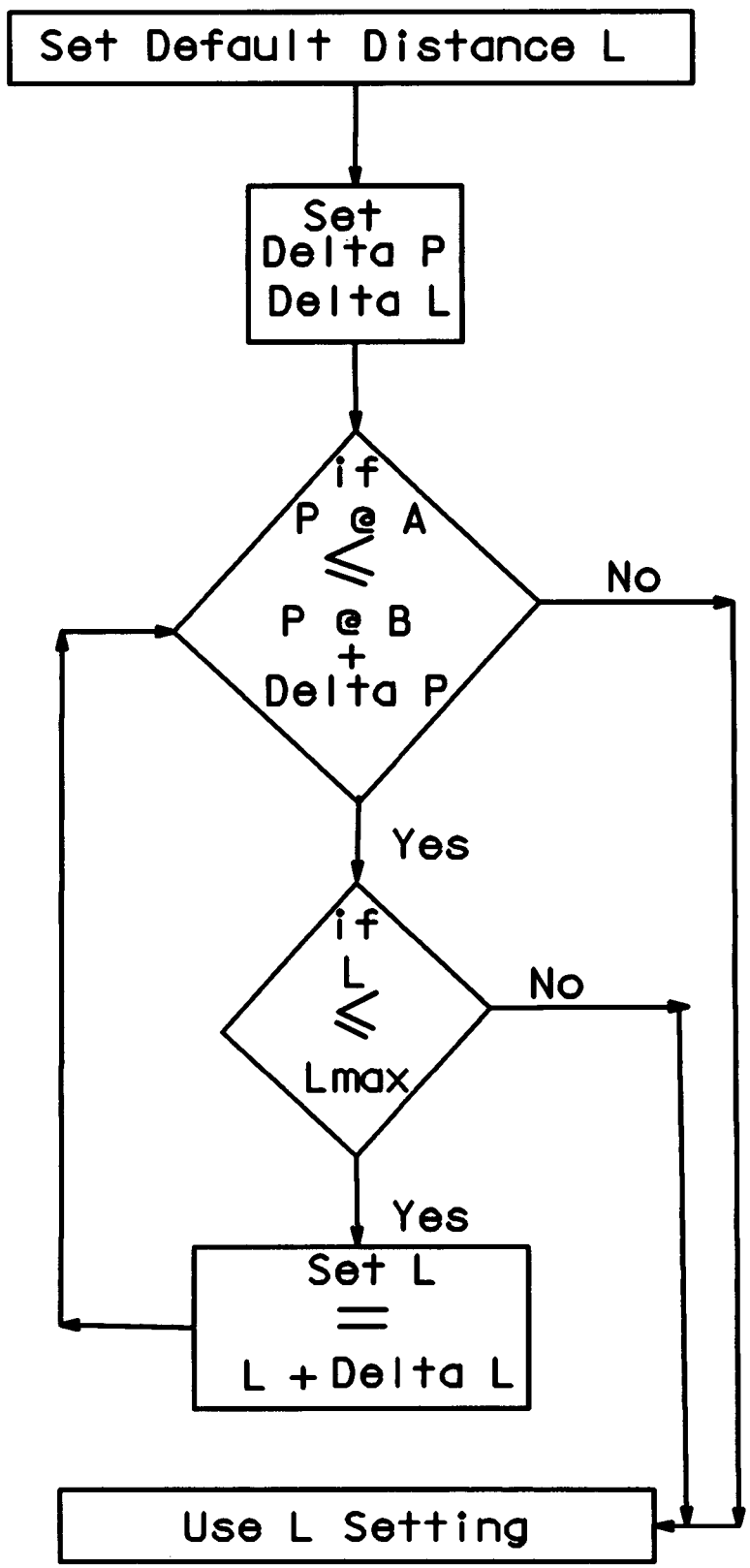
FIG. 13 is a flow chart which illustrates the algorithm and logic of using the devices similar to these shown in FIG. 2 and FIG. 4.

Referring to FIG. 11 and FIG. 12, flow reflectors similar to those shown in FIG. 2 and FIG. 4 are used for a boat 141 and a car 151, respectively. These flow reflectors are mounted on the boat and the car with mounting devices similar to these shown in FIG. 7. Therefore, the length L (Referring to FIG. 11 and FIG. 12), can be adjusted. Referring to FIG. 13, to use the invented devices, a user firstly inputs a desired (or default) distance L into a controller (not shown). The default distance is the minimum distances that the flow reflector will be placed in the front of the boat or the car when in uses. Then the user inputs two other numbers, the Delta P and the Delta L, into the controller. The delta P is the allowable fluctuations of the pressure measurements of the pressure sensors. The Delta L is the allowable distance increments that can be added by the mounting devices to the distance L until the extension limits of the mounting devices are reached. When the user starts the car or the boat and uses the invented devices, the flow reflector will be pushed forward to the default distance L ahead of the car or the boat. After movement of the car or the boat, pseudo fronts will be generated. When the boundaries of the pseudo fronts 147 and 157, FIG. 11 and FIG. 12 respectively, do not reach to cover the pressure sensor B, the pressure measurements of the sensors A will be lower than those of the pressure sensors B. Due to the turbulence, the boundaries of the pseudo fronts 147 and 157 will fluctuate therefore the measurements at pressure sensors B will fluctuate. The allowable fluctuation pressure measurement, Delta P, is thus needed for comparisons of the measurements between the pressure sensors. When the pressure measurement at the sensors A are less than or equal to those of the sensors B plus Delta P and the movement limits of the mounting devices are not reached, the flow reflectors will be moved forward by a distance Delta L. Then, the comparisons of the measurements will be carried out again and the locations of the flow reflectors will be adjusted again. These processes will be repeated until the pseudo fronts reach the positions 148 or 158, FIG. 11 and FIG. 12 respectively, or the flow reflectors cannot be moved forward any more. When the speed of the boat or the car is reduced, the mounting devices will retract the flow defectors back to the default distance L ahead of the car or the boat. Then, the location adjustment processes for the flow reflectors will start again. When the car or the boat is stopped, the flow reflectors will be retreated to their original relative locations before their uses.

Figure 14:
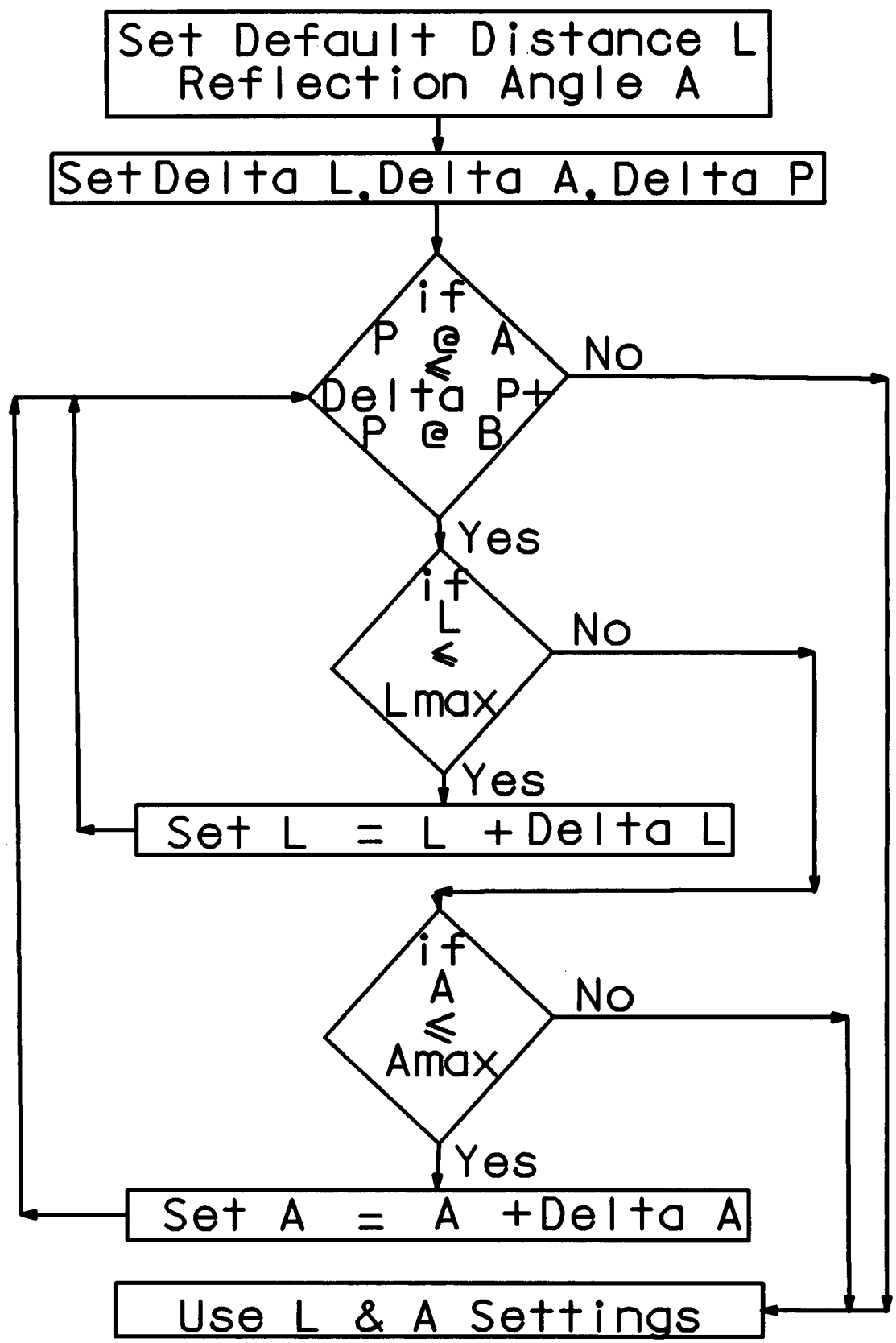
FIG. 14 is a flow chart which illustrates the algorithm and logic of using the devices shown in FIG. 6 or FIG. 8.

Referring to FIG. 11 and FIG. 12, flow reflectors similar to those shown in FIG. 6 and FIG. 8 are used for a boat 141 and a car 151, respectively. These flow reflectors are mounted on the boat and the car with mounting devices similar to these shown in FIG. 7. Therefore, the length L (Referring back to the previous paragraph and FIG. 11 and FIG. 12), the reflection angle A (referring to previous paragraphs which describe the invented devices shown in FIG. 6 and FIG. 8) can be adjusted. Referring to FIG. 14, to use the invented devices, a user firstly inputs a desired (or default) distance L and reflection angle A into a controller (not shown). The default distance is the minimum distances that the flow reflector will be placed in the front of the boat or the car when in uses. The reflection angle A is either the inclinations of the relative angles of the plates of the adjustable flow reflection ducts or the ratios of openings of the entrances and these of the exits of the adjustable flow reflection ducts, depending which invented devices will be used. The inclinations of the plates and/or the ratios of openings can alter the velocities of the reflected flows. The combinations of the incoming flow velocities and the reflected flow velocities decide the reflection angles. Then the user inputs three other numbers, the Delta L, the Delta A and the Delta P, into the controller. The Delta L and the Delta P are the same as those described in the previous paragraph. The Delta A is the allowable reflection angle increments that can be added by the mounting devices to the reflection angle A until the extension limits of the mounting devices are reached. When the user starts the car or the boat and uses the invented devices, the flow reflector will be pushed forward to the default distance L ahead of the car or the boat. The ratios of the openings and/or the inclinations of the plates will be set so that the reflection angle A could be theoretically reached. After movements of the car or the boat, pseudo fronts will be generated. When the boundaries of the pseudo fronts 147 and 157, FIG. 11 and FIG. 12 respectively, do not reach to cover the pressure sensors B, the pressure measurements of the sensors A will be lower than those of the pressure sensors B. When the pressure measurements at the sensors A are less than or equal to those of the sensors B plus Delta P and the movement limits of the mounting devices are not reached, the flow reflectors will be moved forward by a distance Delta L. Then, the comparisons of the measurements will be carried out again and the locations of the flow reflectors will be adjusted again. These processes will be repeated until the pseudo fronts reach the positions 148 or 158, FIG. 11 and FIG. 12 respectively, or the flow reflectors can not be moved forward any more. When the pseudo fronts can not reach the positions 148 or 158 and the flow reflectors can not be moved forward any more and the reflection angles A do not reach the theoretical maximum reflection angles, the reflection angle will be increased by Delta A. Then, the comparisons of the measurements will be carried out again and the reflection angles of the adjustable flow reflectors will be adjusted again. These processes will be repeated until the pseudo fronts reach the positions 148 or 158, FIG. 11 and FIG. 12 respectively, or the reflection angles can not be adjusted any more. When the speed of the boat or the car is reduced, the mounting devices will retract the flow defectors back to the default distance L ahead of the car or the boat. The reflection angles will then be adjusted back to the original reflection angles A. Then, the adjustment processes for the adjustable flow reflectors will start again. When the car or the boat is stopped, the adjustable flow reflectors will be retreated to their original relative locations before their uses.

Figure 15:
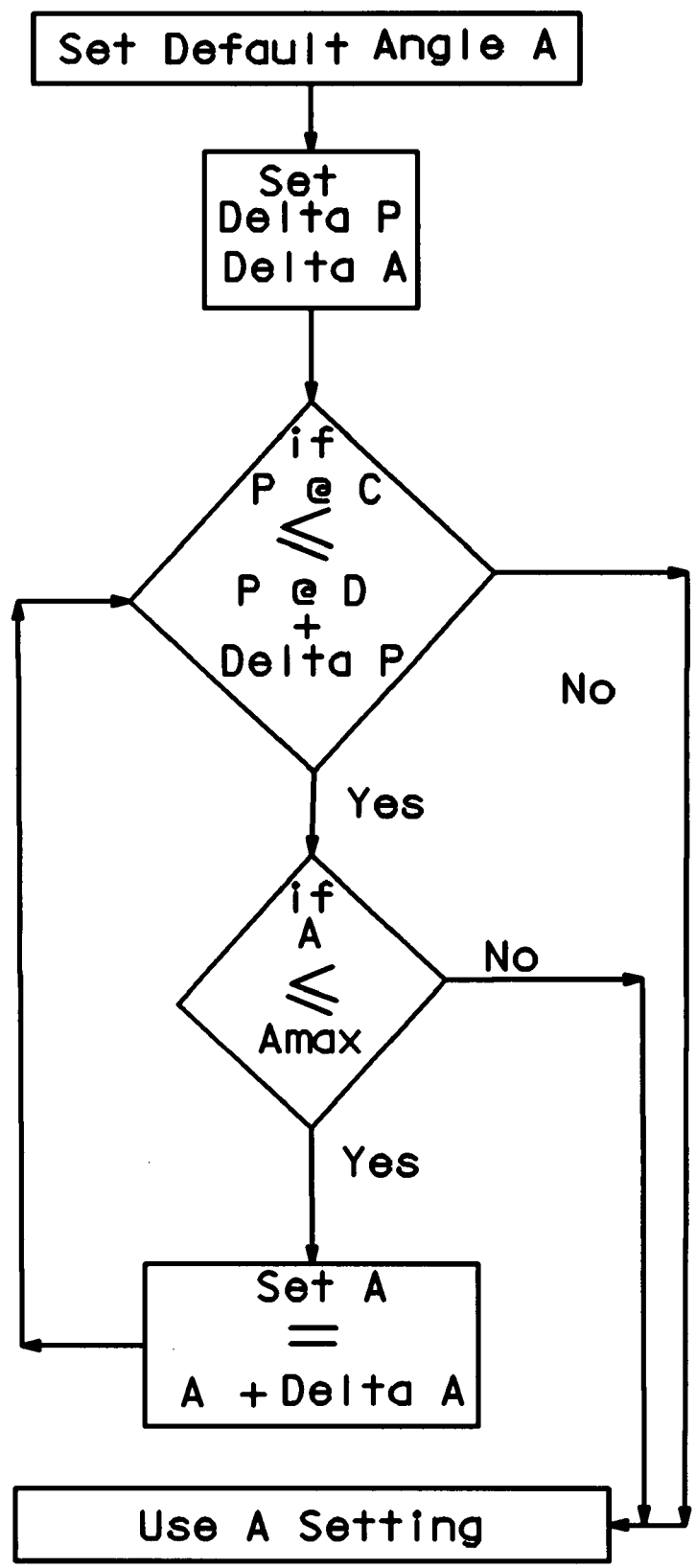
FIG. 15 is a flow chart which illustrates the algorithm and logic of using the device shown in FIG. 10.

Referring to FIG. 11 and FIG. 12, flow reflectors similar to those shown in FIG. 10 are used for a boat 141 and a car 151, respectively. The controllers of these adjustable flow reflectors are mounted on the boat and the car with mounting devices similar to these shown in FIG. 7. Therefore, the directions of the reflected flows can be adjusted. Referring to FIG. 15, to use the invented devices, a user firstly inputs a desired (or default) angle A into a controller (not shown). Then the user inputs two other numbers, the Delta P and the Delta A, into the controller. The Delta P is the allowable fluctuations of the pressure measurements of the pressure sensors. The Delta A is the allowable angle increments that can be added by the mounting devices to the angle A until the extension limits of the mounting devices are reached. When the user starts the car or the boat and uses the invented devices, the adjustable flow reflectors will reflect flows to the angle A with respect to the moving directions of the car or the boat. After movements of the car or the boat, pseudo boundaries 149 and 159, FIG. 11 and FIG. 12 respectively, will be generated. When the pseudo boundaries do not reach the ideal pseudo boundaries 144 and 154, FIG. 11 and FIG. 12 respectively, the pressure measurements by the sensors C will not be about the same as those at the sensors D. Due to the turbulence, the boundaries of the pseudo fronts 149 and 159 will fluctuate therefore the measurements at pressure sensors C and D will fluctuate. The allowable fluctuation pressure measurement, Delta P, is thus needed for comparisons of the measurements between the pressure sensors. When the pressure measurements at the sensors C are less than or equal to those of the sensors D plus the Delta P and the movement limits of the mounting devices are not reached, the angles of the reflected flows will be adjusted by a Delta A. Then, the comparisons of the measurements will be carried out again and the reflected angles will be adjusted again. These processes will be repeated until the pressure measurements at the sensors C are less than or equal to those of the sensors D plus the Delta P or the movement limits of the mounting devices are reached. When the speed of the boat or the car is reduced, the mounting devices will retract the flow defectors back to the default angle A. Then, the angle adjustment processes for the adjustable flow reflectors will start again. Accordingly, control means is or are provided to be responsive to flow medium pressure sensing proximate the front and rear of said support means, to control said distance L, thereby to minimize drag of the medium exerted on the support means. The control means comprises pressure sensors located proximate the duct, and proximate the secondary duct, with actuator means to control L, and circuitry responsive to outputs of said sensors, to control said actuator means.

The foregoing is considered as illustrative only of the principles of the invention. Furthermore, since numerous modifications and changes will readily occur to those skilled in the art, it is not desired to limit the invention to the exact construction and operation shown and described, and accordingly all suitable modifications and equivalents, may be resorted to, falling within the scope of the invention as claimed.

We claim:

1. A drag reduction means which comprises a primary duct and an elongated support means; said primary duct being configured to sidewardly deflect primary flows of a fluid which pass through said duct; said primary duct being mounted on one end of said support means of which another end is mounted on an object in the form of a vehicle which can move in the fluid to propel the primary duct forwardly into the fluid, at a location spaced forwardly of the vehicle, the support means adjusting longitudinally forwardly of the vehicle to position the primary duct at said location, the deflected fluid directed away from the vehicle frontwardly thereof to reduce drag on a side or sides of the vehicle, at least one secondary duct located on and proximate the rear of the vehicle to discharge a secondary stream of said fluid into the flow field rearwardly of the support means and vehicle, said support means being lengthwise movable relative to the vehicle, to bodily shift the primary duct longitudinally generally toward and away from the vehicle and said secondary duct, and through a range encompassing a substantial portion of the distance between the vehicle and the forwardmost position of the primary duct, there being means at the side of the vehicle to receive said secondary stream for flow to said secondary duct.

2. A drag reduction means of claim 1 in which said support means comprises multiple rods at least one of which is extensible.

3. A drag reduction means of claim 1 including means for adjusting the ratio of the cross-sectional areas of the entrance and the exit of said ducts.

4. Drag reduction means of claim 1 including pressure sensors and a controller; said drag reduction means being mounted in the front of said vehicle; one of said pressure sensors being mounted on the front of said vehicle; another said pressure sensor being mounted near said drag reduction means; said controller responsive to inputs from said pressure sensors to control said drag reduction means.

5. Drag reduction means of claim 1 mounted on the front of said vehicle, another drag reduction means in multiple form and including said secondary duct mounted near the back end of said vehicle, pressure sensors and a controller; one of said pressure sensors being mounted on the front of said vehicle; another of said pressure sensors being mounted on the back of said object; additional pressure sensors mounted near each of said drag reduction means; said controller responsive to inputs from said pressure sensors to control said drag reduction means.

6. A drag reduction means, as defined in claim 1 including:
   a) said primary duct having an inlet presented toward a flow field to receive a portion of that flow, the remaining flow field passing the primary duct in a generally relatively longitudinal direction,
   b) the primary duct having an outlet presented laterally toward said passing flow to discharge intaken fluid as a jet stream generally laterally into the passing flow field to mingle therewith, with resultant flow direction to produce deflected components having lateral and longitudinal directions,
   c) said primary duct having a smoothly curved reducing area intermediate portion between said inlet and said outlet to accelerate flow in the duct toward said outlet,
   d) said deflected components being directed relatively away from the side of said support means, said outlet facing away from said side.

7. The combination of claim 6 wherein said vehicle is a boat having a forwardmost region said inlet projecting forwardly of said region, into oncoming medium, said medium consisting of water.

8. The combination of claim 6 wherein said inlet and outlet are vertically elongated.

9. The combination of claim 6 wherein said outlet includes outlet portions facing in opposite directions.

10. The combination of claim 9 wherein said outlet portions are located in forwardly spaced relation to the forwardmost extent of said support means, whereby said deflected medium components define paths extending relatively away from opposite sides of said support means.

11. The combination of claim 6 wherein said outlet has curvature extending transversely about the longitudinal direction of flow toward said inlet.

12. The combination of claim 6 wherein said duct comprises multiple plates, there being one or more control elements connected to one or more of the plates to shift plate position for controlling the direction of said jet stream.

13. The combination of claim 6 wherein said primary duct includes relatively movable multiple parts, there being one or more control elements connected to one or more of said parts to shift part position for controlling the direction of a flow jet stream.

14. The combination of claim 13 wherein said parts comprise elongated plates.

15. The combination of claim 1 including control means responsive to medium pressure sensing proximate the front and rear of said support means, to control support means positioning, thereby to minimize drag of the medium exerted on the support means.

16. The combination of claim 15 wherein said control means includes flow medium pressure sensors located proximate the primary duct, and proximate the secondary duct, to control support means positioning.

* * * * *